United States Patent [19]
Kitagawa

[11] 3,778,782
[45] Dec. 11, 1973

[54] IGFET DYNAMIC ADDRESS DECODE CIRCUIT

[75] Inventor: Norihisa Kitagawa, Houston, Tex.

[73] Assignee: Texas Instruments Incorporated, Dallas, Tex.

[22] Filed: July 12, 1971

[21] Appl. No.: 161,816

[52] U.S. Cl. .............. 340/173 R, 307/205, 307/244
[51] Int. Cl. .............. G11c 7/00
[58] Field of Search .............. 340/173 R; 307/205, 307/208, 244

[56] References Cited

UNITED STATES PATENTS

| | | | |
|---|---|---|---|
| 3,644,904 | 2/1972 | Baker | 340/173 R |
| 3,609,329 | 9/1971 | Martin | 307/205 X |
| 3,541,353 | 11/1970 | Seelbach | 307/205 X |
| 3,641,511 | 2/1972 | Cricchi | 340/173 R |

OTHER PUBLICATIONS

Ruoff, Field Effect Transistor Clocked Logic, 9/65, IBM Technical Disclosure Bulletin, Vol. 8 No. 4, pp. 640–641.

Linton, FET Decoder Circuit, 5/70, IBM Technical Disclosure Bulletin, Vol. 12 No. 12, p. 2082.

*Primary Examiner*—Bernard Konick
*Assistant Examiner*—Stuart Hecker
*Attorney*—Harold Levine et al.

[57] ABSTRACT

Disclosed is a high speed low power dynamic address decode circuit integrated on a monolithic chip. The circuit requires only two clocks for operation and utilizes only true data inputs, thereby eliminating the need for data complement input lines. The circuit exhibits zero static power loss and increased packing density as compared to conventional decode circuits requiring both true and complementary input signals. To provide generally faster dynamic operation, the circuit precharges line and inherent capacitance prior to application of the data pulses.

14 Claims, 8 Drawing Figures

INVENTOR
Norithisa Kitagawa

BY Richard L Donaldson
ATTORNEY

IGFET DYNAMIC ADDRESS DECODE CIRCUIT

This invention relates to decode circuits in general and more specifically to an insulated gate field effect transistor dynamic decode circuit which requires only true data inputs.

Memory arrays generally include a row and column matrix of memory cells. A specific cell may be accessed by simultaneously activating an *x* or row data line and a *y* or column data line. The *x*, *y* coordinate position of a desired memory cell is typically represented by a unique binary number which is "decoded" by a suitable *x* and *y* decode circuit to select the desired memory cell. The decode circuits respectively charge the *x* and *y* data line corresponding to the desired cell to a relatively high voltage, generally in the range of 6–15 volts. This voltage may be either negative or positive depending on whether *p* channel or n channel IGFET devices are being controlled. The dynamic operation of a decode circuit in an IGFET memory system is important in reducing access time to the system and in reducing power consumption. The dynamic circuits presently used in IGFET decoded memory systems have the undesirable speed-power considerations of low power but slow speed, or high speed but high power consumption. Conventional decode circuits use true and complementary input signals and perform a logic "NOR" function upon them. This combination produces the desired unique output per specific input, but at the expense of high power or low speed.

Accordingly, it is an object of the present invention to produce an improved IGFET decoding circuit which will function at high speed with low power consumption.

It is a further object of the present invention to reduce the number of input control lines of an IGFET decode circuit to thereby increase packing density.

Briefly and in accordance with the present invention a two stage dynamic IGFET decode circuit is integrated on a monolithic chip. The first stage is gated with a two phase clock such that selective address inputs are valid during one clock only, and the capacitance at the output node of the first stage is pre-charged during the other clock. The first stage comprises a NOR circuit, the output of which is a negative logic "NOR" function of a first set of data input signals. The output signal is applied to the second stage of the decode circuit, which also has a two phase clock system, that logically "ANDS" the output of the first stage with a second set of data input signals.

The novel features believed to be characteristic of this invention are set forth in the appended claims. The invention itself, however, as well as other objects and advantages thereof, may best be understood by reference to the following detailed description when read in conjunction with the accompanying drawings, wherein:

FIG. 1 schematically depicts a decoding circuit in accordance with one embodiment of the present invention;

Figure 1:
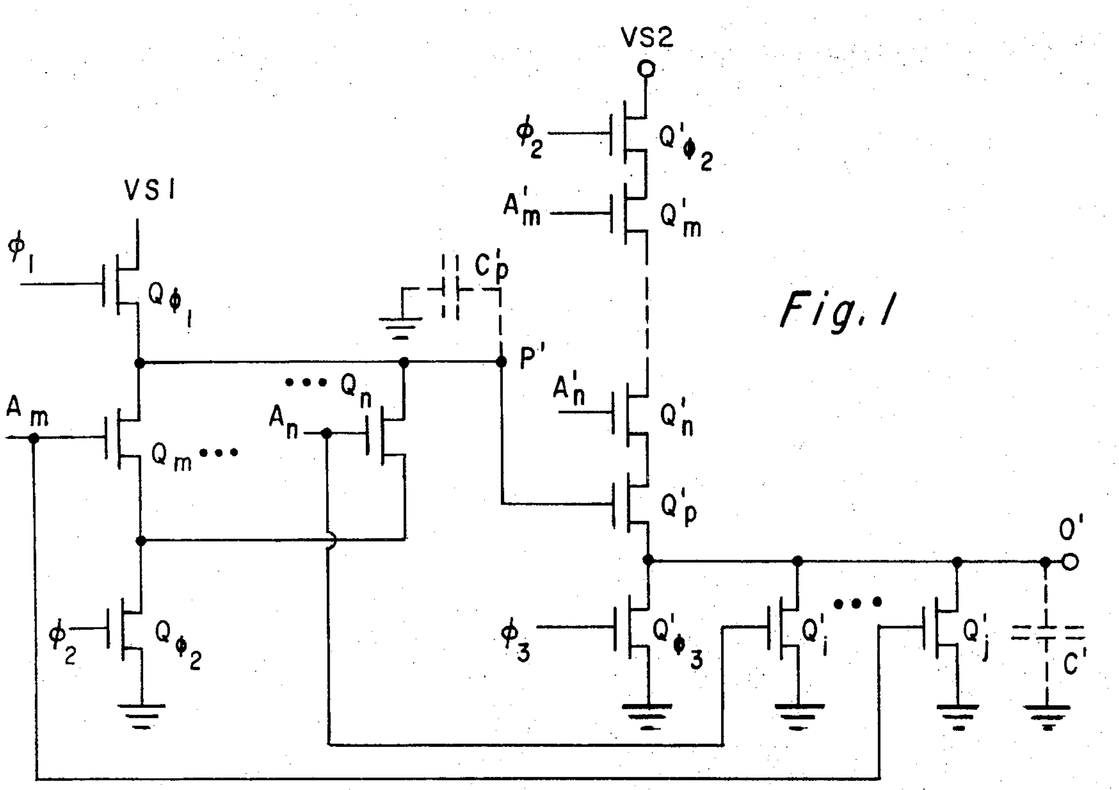
Figure 2A:
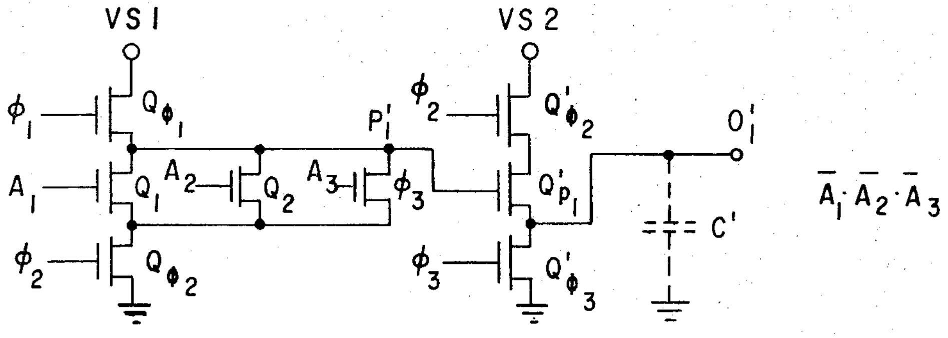
FIGS. 2A–2D is a partial set of decode circuits in accordance with the present invention that may be used for the situation where there are three data input lines.
Figure 2B:
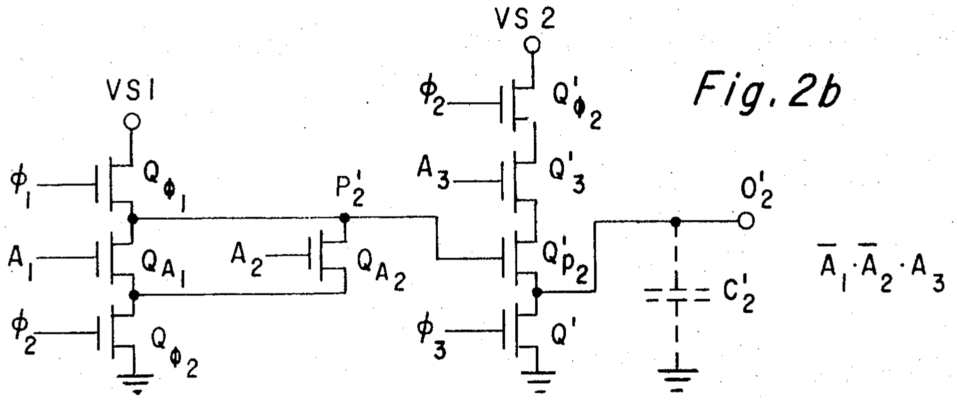
Figure 2C:
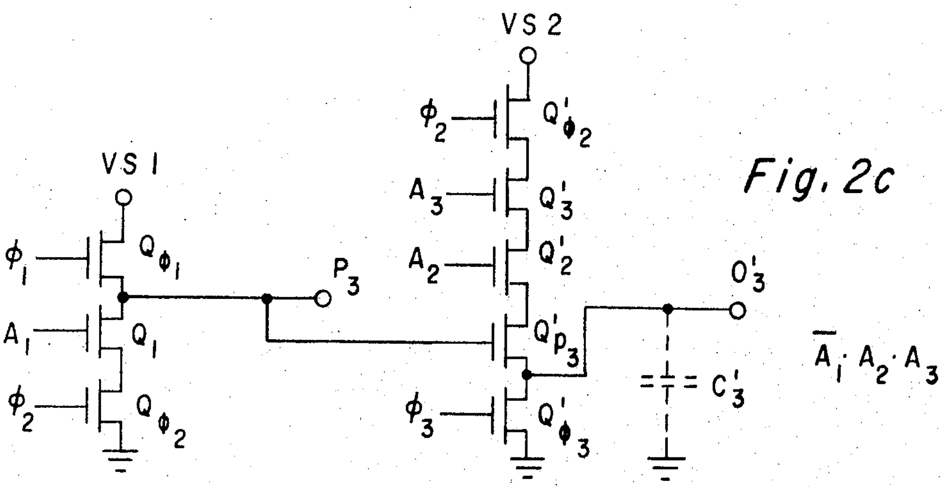
Figure 2D:
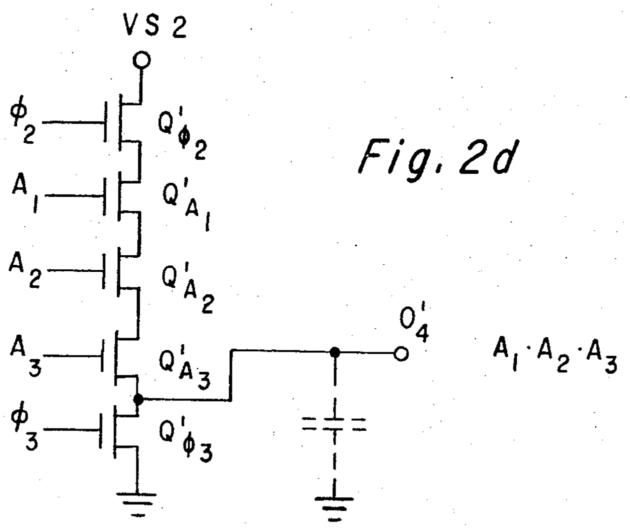
Figure 4:
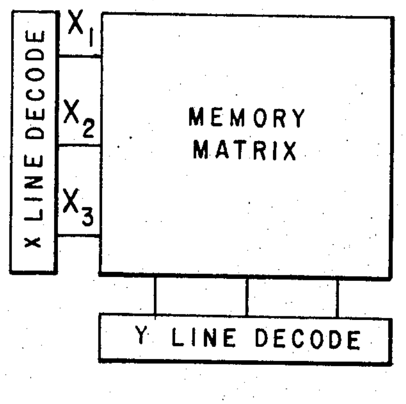
FIG. 4 is a block diagram of a memory decode circuit that may be utilized to address random cells of a memory matrix.

With reference now to the drawings and for the present specifically to FIG. 1 and 4, there is depicted in block form a memory matrix having *x* and *y* coordinates and its corresponding decode circuit. For the situation where there are "N" bits of data used to define the *x* and y coordinates of the memory matrix, there may be $2^N$ selectively addressable cells along each side. For example, if there are $2^3$ memory cells along each side of the memory matrix then $N=3$, and three decode circuits are needed for each ordinate determination. By way of example, a decode circuit, such as illustrated in FIG. 1 may be used for each of the decode circuits. For this situation, the output node O′ would be connected to one of the decode lines such as $X_1$ shown in the block diagram of FIG. 4.

In FIG. 1 the capacitance C′ on the output terminal O′ represents both the parasitic capacitance and the relatively high stored capacitance of the line resulting from interconnection of the various IGFET devices making up the row or column of cells in the matrix. As understood by those skilled in the art, for high speed operation a memory matrix line must be capable of being charged and discharged very rapidly. It is well known, however, that IGFET devices are very slow in charging a high capacitance load. The invention overcomes this slow charging characteristic by using a "precharge" technique, whereby access time to the memory is reduced.

The decoder of FIG. 1 may be described generally as a two stage circuit, the first stage having as its output a negative logic "NOR" function which is "ANDed" by the second stage with a set of data input signals. The first stage comprises a gating transistor Q$\phi$1 having a source connected to a voltage source $VS_1$, its gate connected to an external clock source $\phi$1, and its drain connected to a set of parallel input transistors $Q_m$ . . . $Q_n$ having common sources and common drains, and each having a gate to receive a first set of input signals $A_m$ . . . $A_n$. The output of the first stage is taken from the common source node P′ of transistors $Q_m$ . . . $Q_n$. The common drain of the parallel input transistors $Q_m$ . . . $Q_n$ is connected to the source of a second gating transistor Q$\phi$2, having its drain connected to ground, and having a gate to receive a second clock source $\phi$2.

The second stage comprises a third gating transistor Q$\phi$2 with its source connected to a voltage source $VS_2$, having a gate to receive external clock $\phi$2, and having its drain connected to a set of series connected input transistors $Q'_m$ . . . $Q'_n$, each having a gate to receive a second set of input signals $A'_m$ . . . $A'_n$. This set of series connected transistors is connected to the source of transistor Q′P, the gate of which is connected to the output node P′ of the first stage. The drain of transistor Q′P is connected to the output terminal O′ of the decode circuit. The source of fourth gating transistor Q′$\phi$3 is also connected to the output terminal O′. The drain of transistor Q′$\phi$3 is connected to circuit ground, having its gate for receiving a third external clock source $\phi$3. The source-drain circuits of an additional set of transistors $Q'_1$ . . . $Q'_j$ are commonly connected in parallel with the source-drain circuit of gating transistor Q′$\phi$3, transistors $Q'_i$ . . . $Q'_j$ having gates to receive the first set of input data signals $A_m$ . . . $A_n$.

Figure 3:
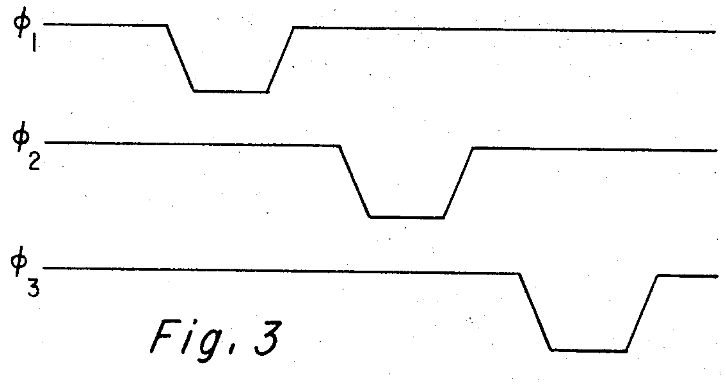
FIG. 3 shows typical wave forms associated with the invention.

Operation of the decoding circuit is as follows. A clock pulse $\phi 1$ as shown in FIG. 3 is generated in accordance with techniques well known in the art and is applied to the gate terminal of transistor $Q\phi 1$. The terminology is understood to be in negative logic, where zero volts is a 0 and 1 is a high negative voltage. Upon $\phi 1$ going to a 1 the capacitance $C_p'$ at node P' charges via the path $VS_1$ — the source-drain path of $Q\phi 1$ — circuit ground. The P' node is thus pre-charged high before the data inputs $A_m \ldots A_n$ are enabled to affect the node P' by clock two going high. Upon any of the data inputs $A_m \ldots A_n$ being high when $\phi 2$ is high, then the voltage pre-charged at node P' is discharged through the data input transistors $Q_m \ldots Q_n$ and $Q\phi 2$ transistor combination to circuit ground. Transistor $Q\phi 2$ is of sufficiently large geometry to insure a fast discharge time. Thus, it may be seen that the output signal at node P' is a logic "NOR" function of the set of data input $A_m \ldots A_n$, i.e., if any of the data inputs are logic 1, the output is logic 0.

Upon clock $\phi 2$ going high and biasing "on" gating transistor $Q'\phi 2$, the output terminal O' is charged to a high value only when the selective combination is encountered where all the data inputs $A'_m \ldots A'_n$ are high. For illustrative purposes it will be assumed that three data input signals $A_1$, $A_2$ and $A_3$ are utilized as $A'_m \ldots A'_n$. As may be seen from Table 1, eight possible decode combinations exist for a three input signal. Only when $A_1=A$, $A_2=B$, and $A_3=C$ will the output for this particular circuit be high. In Table 1, "A" denotes a low or logic zero input signal and "$\overline{A}$" represents a logic 1 value of the signal.

The clock $\phi 3$ is used for discharging the output terminal O' after it has been charged during $\phi 2$ to a logical "one" by the application of all high input signals to the gates of transistors $Q_m' \ldots Q_n'$. It is to be understood, however, that $\phi 3$ may be replaced by $\phi 1$ or complementary $\phi 2$ according to the timing of the other memory elements. Upon clock $\phi 3$ going high, if the P' voltage, and $A_m' \ldots A_n'$ voltages all are logically high, then voltage O' discharges through the parallel combination of $Q'\phi 3$ and the parallel output transistors $Q'_i \ldots Q'_j$ to circuit ground. The parallel output transistors, having input signals $A_m \ldots A_n$ connected to their gates, in all circuits having at least one high input signal, reduce the output "zero" level by increasing the circuit's current sink capacity.

As previously explained the voltage signal at node P' is actually a logic "NOR" combination of the input signals $A_m \ldots A_n$. This signal is gated into one transistor, Q'P, in the second state logic "AND" circuit, and the load capacitance is small enough, due to only a one transistor load $Q\phi 1$ in the first stage "NOR" circuit, to allow rather fast discharging time of node P'. The current design keeping the node P' charged during the time when the voltage at P' is not true, allows overall fast circuit operation and zero timing delay. That is, propagation time is shortened by the elimination of having to wait for the node to selectively charge during the time $\phi 2$ is high. As the clocks are required to be out of phase, this circuit draws zero static power.

If the memory matrix is, for example, a 32 × 32 bit matrix or larger, the circuit of FIG. 1 may be advantageous because of parallel output transistors $O'_i \ldots Q'_j$. For smaller memory matrices, however, the circuits of FIG. 2 may be desired.

As is noted the concept of the embodiments in FIG. 2 operate in a manner similar to that above described with reference to FIG. 1, i.e., only true inputs are selectively applied to a "NOR" circuit. The output of the "NOR" circuit is applied to an "AND" circuit along with a second set of selective inputs. The difference is that there are no output transistors in parallel to reduce the low level of the output. The output logic equation of the "NOR - AND" circuits is as given below.

$$O' = (\overline{A_m + \ldots + A_n}) \cdot (A_m' \cdot \ldots \cdot A_n')$$
$$= (\overline{A_m} \cdot \ldots \cdot \overline{A_n}) \cdot (A_m' \cdot \ldots \cdot A_n')$$

| Data Input | Decode Output (Matrix address line) |
|---|---|
| ABC | 2 |
| $\overline{A}BC$ | |
| $A\overline{B}C$ | |
| $AB\overline{C}$ | |
| $\overline{AB}C$ | |
| $\overline{A}B\overline{C}$ | |
| $A\overline{BC}$ | 8 |
| $\overline{ABC}$ | |

TABLE 1

To simplify further circuit description the selective data input signals which are applied to the first stage NOR gate are designated A and the selective data inputs applied to the second stage AND gate are designated A'. Looking at FIG. 2b, inputs $A_1$ and $A_2$ are applied to the gates of the first stage NOR circuit transistors $QA_1$ and $QA_2$, and input $A_3$ is applied to the gate of second stage AND circuit transistor $Q'_3$. Thus, $A_3$ is designated an A' input. When clock $\phi 1$ goes high biasing on transistor $Q\phi 1$, a circuit is completed from voltage source $VS_1$ to node $P'_2$ enabling the inherent capacitance at $P'_2$ to become charged. Upon $\phi 1$ going low, clock $\phi 2$ then goes high. The voltage at node $P'_2$ will remain high as long as input transistors $QA_1$ and $QA_2$ remain off, or as long as input signals $A_1$ and $A_2$ both remain logic zeroes. Because clock $\phi 2$ is also connected to the gate of transistor $Q'\phi 2$, when $\phi 2$ goes high then a voltage is applied to the source of data input transistor $Q'_3$, which has a gate for receiving the A' input signal. If the A' signal is high, transistor $Q'_3$ conducts and a circuit path is completed from voltage source $VS_2$ through transistor $Q'P_2$, which has been turned on by the high output of the first stage NOR circuit at node $P'_2$. The output $O_2'$ thus goes to the desired high state. For a decode system it is necessary that a high output be produced for only one unique input combination. For the example of FIG. 2(b), the high output is achieved for the selected combination of input signals $\overline{A_1}$, $\overline{A_2}$, $A_3$, using the nomenclature that a barred signal is a logic zero. Thus, whenever a selected input $A_m \ldots A_n$ is applied to the parallel input transistors $Q_m \ldots Q_n$ then that signal appears as a barred signal at the output node P', and whenever a selected input $A'_m \ldots A'_n$ signal is applied to the series "AND" circuit of the second stage (transistors $Q_m' \ldots Q_n'$), that signal appears as an unbarred signal at the output O'. Thus using the present invention and convention described, to get a desired output response to input combination $\overline{A_1} \cdot \overline{A_2} \cdot \overline{A_3}$, we would apply selective input signals $A_1$, $A_2$, and $A_3$ all to the parallel input circuit, and the second stage AND circuit would only be comprised of the two gating transistors $Q'\phi 2$ and $Q'\phi 3$ and the transistor Q'P, as in FIG. 2a. Likewise, the circuit designed for input combination $\overline{A_1} \cdot A_2 \cdot A_3$ is as in FIG. 2c where only $A_1$ would be applied to the gate of the first stage input transistor $Q_1$, and selective signals $A_2$ and $A_3$ would be applied to the series input transistors $Q'_2$ and $Q'_3$ of the second stage. Also, to activate a line for the input sequence $A_1 \cdot A_2 \cdot A_3$, no inputs would be applied to the first stage input NOR circuit, but all inputs $A_1$, $A_2$, and $A_3$ would be applied to the second stage series input configuration transistors $Q'A_1$, $Q'A_2$, and $Q'A_3$, as illustrated in FIG. 2(*d*).

With respect to disign layout the present invention has the advantage of requiring only the number of address bus lines to the decode circuit as that of the true address inputs. Complementary input signals do not need to be generated, which eliminates one conventional bus line. Thus, the packing density may be greater than that of the usual decode circuit requiring complementary address bus lines, as no additional surface area is required upon which to deposit complementary input lines.

Figure 5:
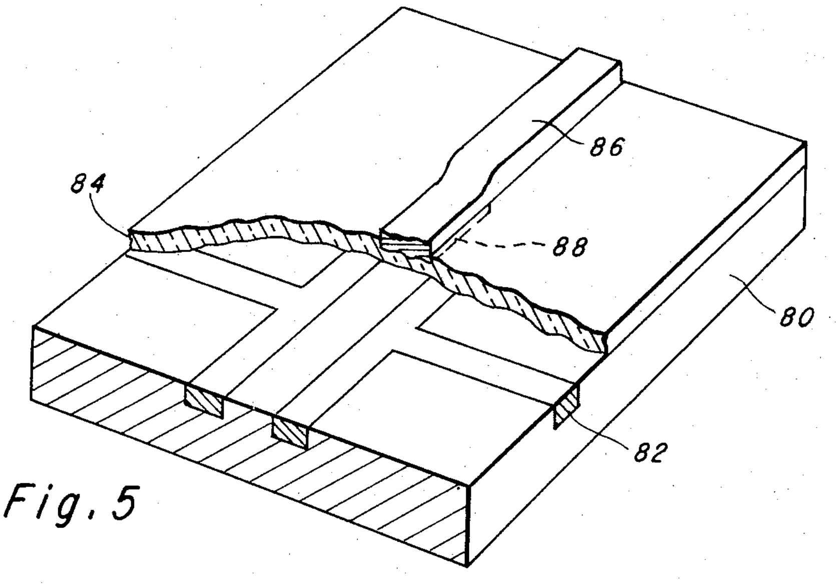
FIG. 5 is an isometric view of a section of an integrated circuit into which the decode circuit may be fabricated, with a partial cut away of the insulating and metalization layers for graphic purposes.

With reference to FIG. 5, an integrated circuit implementation of the decode system of the present invention is shown. Assuming by way of illustration that the transistors are to be p-channel devices, an n-type substrate 80 having an appropriate resistivity is utilized. The substrate 80 may, for example, comprise n-type silicon having a donor concentration on the order of $10^{15}$ atoms/cm$^3$. By conventional masking and diffusion techniques, p-type dopants are diffused into the surface of the substrate 80 to form conductors of p-type semiconductor material as illustrated generally at reference numeral 82. In the areas where an IGFET is to be formed, two parallel p-type regions are diffused into the substrate respectively forming the source and drain regions of the transistor. A layer of insulating material 84 is formed on the surface of the semiconductor substrate 80. This layer may, e.g., comprise silicon dioxide having a thickness on the order of 10,000A. To form the transistor it is necessary that the thickness of the insulating layer 84 be reduced to, e.g., about 500 A. in the area overlying the substrate and between the two parallel diffused p-type regions which are to be used as the drain and source of the transistor. A conductive layer 86 is formed to overlie the insulating layer to form the gate terminal. The gate terminal is shown at 86 and the reduced area of the oxide is shown in the region 88. These operations may be performed using well known semiconductor processing techniques and are not described in detail herein. It is understood also that n-channel devices may be formed and that various conductive layers for the gate, such as silicon, aluminum etc., and that various known insulating layers such as silicon dioxide, silicon nitride, combinations thereof etc., may advantageously be utilized.

Although specific embodiments of this invention have been described herein, various modifications to the details of construction will be apparent to those skilled in the art without departing from the scope of the invention.

What is claimed is:

1. A system of IGFET decode circuits for decoding an N digit true input signal comprising:

a. a first plurality of logic NOR circuits, each circuit thereof responsive to a unique subset $R_i$ digits of said input signal for generating at its output node having inherent capacitance to circuit ground, a logic NOR combination of said $R_i$ digits; and b. a second plurality of AND logic circuits, each of which is coupled to a respective output node of said first plurality for receiving said NOR combination, said each of said second plurality is further responsive to the $N - R_i$ other digits of said input signal and generate at its output terminal a logic AND combination of said NOR combination and said $N - R_i$ other digits, wherein each of said pluralities consist of $2^N$ in number and each $R_i$ subset applied to one of said first plurality is unique in number of digits from each of the other $R_i$ subsets, with $R_i$ varying from 0 to N, to thereby provide a decode system for an input signal of N digits for generating a unique output therefrom.

2. In a memory system that includes a matrix of randomly accessible memory cells in combination with a clocked decode means for addressing only selected cells of the memory matrix in response to a true input signal of N digits applied to said decode means such that unique subsets thereof consisting of $R_i$ digits are selectively applied, $R_i$ varying from zero to N, the improvement wherein the decode means comprises a plurality of decode circuits each characterized as comprising:

a. a first IGFET circuit for providing an output signal at an output node that is a logic "NOR" of said $R_i$ digits of said subset;

b. a second IGFET circuit having an output node and connected to said first circuit for performing a logic "AND" operation on said "NOR" output signal and the remaining $N - R_i$ digits of said true input signals; and c. a multiple phase clocking system coupled to said first and second circuits to selectively charge and discharge any inherent capacitance at the output nodes of said circuits.

3. A memory system as set forth in claim 2 wherein said first IGFET circuit comprises a set of IGFETs in parallel, having gates adaptive to receive said subset of $R_i$ digits of true input signals, having common sources coupled by said clocking system to a voltage source, and having common drains coupled by said clocking system to circuit ground.

4. A memory system as set forth in claim 3 wherein said second IGFET circuit comprises a second set of IGFETs in series, serially coupled by said clocking system to a voltage source, whereby said any output node capacitance at the drain of the last of said series IGFETs is selectively charged, and said set of second IGFETs is serially coupled by said clocking system to circuit ground.

5. A memory system as set forth in claim 4 wherein said clocking system comprises:

a. a first IGFET connected to said first IGFET circuit and to a voltage source, said transistor having a gate to receive a first clock input signal, whereby said any output node capacitance may be selectively charged;

b. a second IGFET connected to said first IGFET circuit and to circuit ground, said transistor having a gate to receive a second clock input signal, whereby said any output node capacitance may be selectively discharged;

c. a third IGFET connected to said second IGFET circuit and to a voltage source, said transistor having its gate to receive the second clock input signal; and d. a fourth IGFET connected to said second IGFET circuit and to circuit ground, having a gate to receive a third clock input signal, whereby said any output node capacitance may be selectively discharged.

6. The memory system of claim 5 and further including a plurality of IGFETs connected in parallel with said fourth IGFET of said clocking system having gates adaptive to receive said subset of $R_i$ data input signals and having common drains connected to circuit ground.

7. A system of IGFET decode circuits for decoding an N digit true input signal comprising:

a. a first plurality of logic NOR circuits having output nodes, each circuit thereof responsive to a unique subset of $R_i$ digits of said input signal for generating at its output node having inherent capacitance to circuit ground, a logic NOR combination of said $R_i$ digits;

b. a second plurality of biasing means, each one of which second plurality is operably connected to a respective one of said first plurality for selectively precharging said capacitance at each of said output nodes;

c. a third plurality of switching means, each one of which is operably connected to a respective one of said first plurality for selectively discharging said charged capacitance at only the output node having a logic one combination of said $R_i$ digits at its respective input;

d. a fourth plurality of AND logic circuits, having output terminals, each of which is coupled to a respective output node for receiving a NOR signal generated in response to said $R_i$ digits, said each is further responsive to the $N - R_i$ other digits of said input signal and generates at its output terminal the logic AND combination of said NOR combination and said $N - R_i$ other digits, said output terminal having inherent capacitance to circuit ground;

e. fifth plurality of biasing means, each operably connected to a respective output terminal of said fourth plurality for selectively charging said capacitance upon the condition that said NOR signal and said $N - R_i$ digits are all in one logic state; and f. sixth plurality of switching means for selectively discharging said capacitance at each output terminal whereat said NOR signal and said $N - R_i$ digits do not all reside in said one logic state, wherein said pluralities are $2^N$ in number and each $R_i$ subset applied to one of said first plurality is unique in number of digits from each of the other $R_i$ subsets applied to each other of said first plurality, as $R_i$ varies from zero to N, to thereby provide a decode system for decoding an input signal of N digits by generating a unique output for one particular combination of inputs.

8. The decode circuit of claim 7 wherein each of said second plurality of biasing means comprises an IGFET transistor having its source connected to a voltage source, its drain connected to said respective one of said first plurality and having its gate adaptive for receiving first clock input signals.

9. The decode circuit of claim 8 wherein said logic NOR circuit comprises a plurality of IGFET transistors in parallel each having a common source connected to the drain of a respective one of said second plurality, having a common drain connected to said respective one of said third plurality of switching means, and each of said plurality of IGFETs having its gate adaptive for receiving one of said subset of $R_i$ digits of true data input signals.

10. The decode circuit of claim 9 wherein each of said third plurality of switching means comprises an IGFET transistor having its source connected to said common drains of said logic NOR circuits, having its drain connected to circuit ground, and having its gate adaptive for receiving second clock input signals.

11. The decode circuit of claim 10 wherein said fifth plurality of biasing means each comprises an IGFET transistor with its source connected to a voltage source, and its drain connected to said respective output terminal of said fourth plurality, having a gate adaptive for receiving third clock input signals.

12. The decode circuit of claim 11 wherein said fourth plurality of AND logic circuits each comprises series connected IGFETs having gates adaptive for receiving said $N - R_i$ digits and having an output connected to said respective one of said switching means of said sixth plurality.

13. The decode circuit of claim 12 wherein said sixth plurality of switching means comprises a set of IGFETs connected in parallel having common sources connected to a respective one of said output terminals of said fourth plurality, having common drains connected to ground, and having gates adaptive for receiving said $N - R_i$ digits of true data input signals and third clock input signals.

14. The decode circuit of claim 12 wherein said sixth plurality of switching means each comprises an IGFET having its source connected to a respective one of said output terminals of said fourth plurality, having its drain connected to circuit ground, and having its gate adaptive for receiving said third clock input signals.

* * * * *